US012587454B1

(12) United States Patent
Britt et al.

(10) Patent No.: US 12,587,454 B1
(45) Date of Patent: *Mar. 24, 2026

(54) USER-CONFIGURABLE ALERTS FOR COMPUTING SERVERS

(71) Applicant: 8x8, Inc., Campbell, CA (US)

(72) Inventors: Timothy Britt, Campbell, CA (US);
Bryan Martin, Campbell, CA (US);
Christopher Peters, Campbell, CA
(US)

(73) Assignee: 8x8, Inc., Campbell, CA (US)

( * ) Notice: Subject to any disclaimer, the term of this
patent is extended or adjusted under 35
U.S.C. 154(b) by 0 days.

This patent is subject to a terminal dis-
claimer.

(21) Appl. No.: 18/237,338

(22) Filed: Aug. 23, 2023

Related U.S. Application Data

(63) Continuation of application No. 17/313,172, filed on
May 6, 2021, now Pat. No. 11,777,814, which is a
continuation of application No. 14/543,404, filed on
Nov. 17, 2014, now abandoned.

(60) Provisional application No. 61/983,792, filed on Apr.
24, 2014, provisional application No. 61/975,346,
filed on Apr. 4, 2014.

(51) Int. Cl.
*H04L 41/50* (2022.01)
*H04L 43/50* (2022.01)
*H04L 65/10* (2022.01)

(52) U.S. Cl.
CPC .............. *H04L 41/50* (2013.01); *H04L 43/50*
(2013.01); *H04L 65/10* (2013.01)

(58) Field of Classification Search
CPC .......... H04L 41/50; H04L 43/50; H04L 65/10
See application file for complete search history.

(56) References Cited

U.S. PATENT DOCUMENTS

2014/0201572 A1\* 7/2014 Dancy ................... G06F 16/148
714/37

\* cited by examiner

*Primary Examiner* — Brian Whipple
(74) *Attorney, Agent, or Firm* — Vista IP Law Group,
LLP

(57) ABSTRACT

Various example implementations are directed to circuits,
apparatuses, and methods for providing virtual computing
services. According to an example embodiment, an appara-
tus includes a set of computing servers configured to provide
a respective set of virtual servers for each of a plurality of
accounts. The apparatus also includes a processing circuit
communicatively-coupled to the set of computing servers.
The processing circuit is configured to determine an oper-
ating state of the respective set of virtual servers provided
for each account. For each account, the processing circuit is
also configured to provide an alert message to one or more
users specified in a respective alert policy of the account in
response to the operating state of the virtual servers satis-
fying a set of alert criteria indicated in the alert policy.

21 Claims, 4 Drawing Sheets

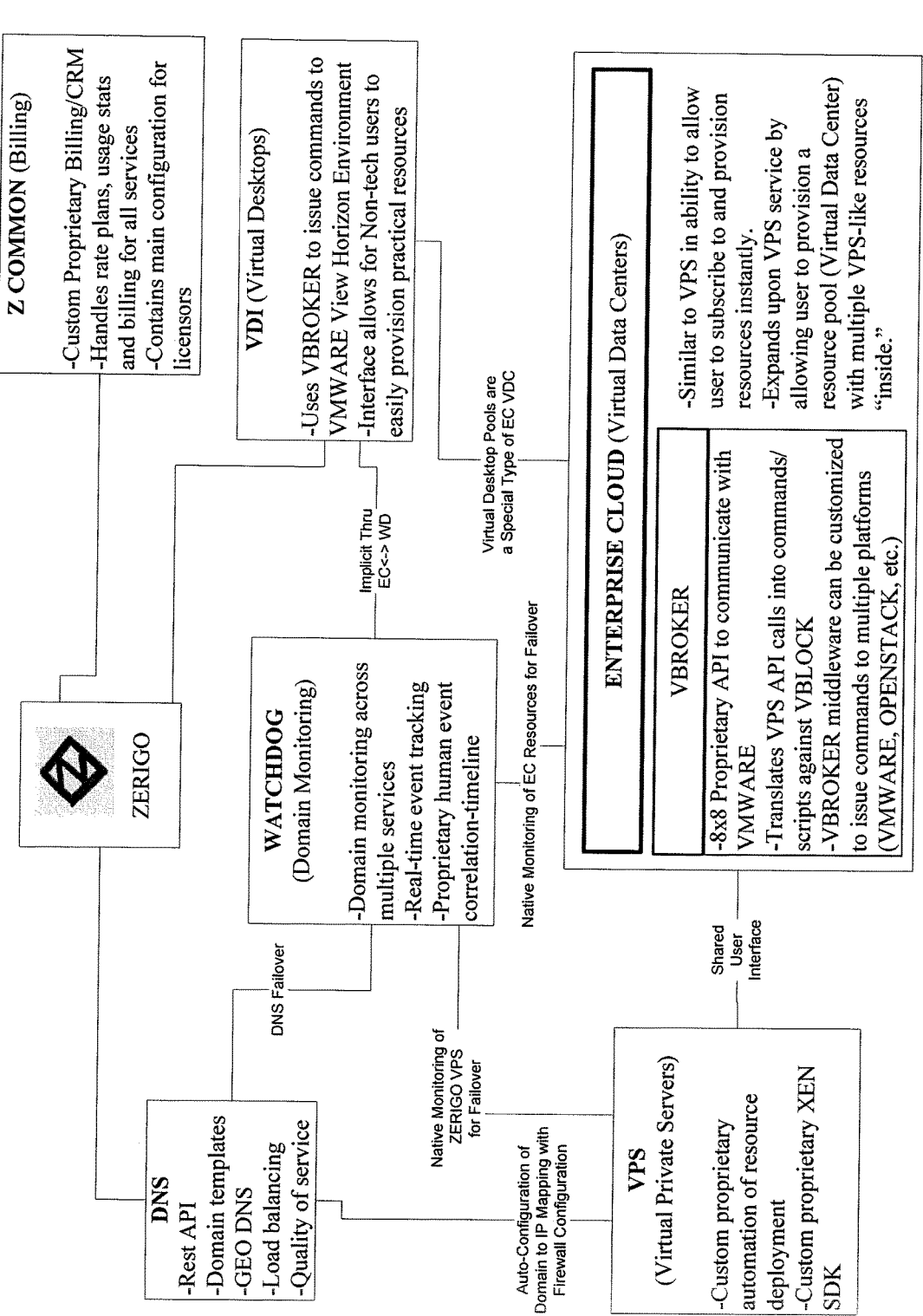

Z COMMON (Billing)

-Custom Proprietary Billing/CRM
-Handles rate plans, usage stats and billing for all services
-Contains main configuration for licensors

VDI (Virtual Desktops)

-Uses VBROKER to issue commands to VMWARE View Horizon Environment
-Interface allows for Non-tech users to easily provision practical resources

ZERIGO

WATCHDOG (Domain Monitoring)

-Domain monitoring across multiple services
-Real-time event tracking
-Proprietary human event correlation-timeline Implicit Thru EC<-> WD Virtual Desktop Pools are a Special Type of EC VDC

ENTERPRISE CLOUD (Virtual Data Centers)

VBROKER

-8x8 Proprietary API to communicate with VMWARE
-Translates VPS API calls into commands/scripts against VBLOCK
-VBROKER middleware can be customized to issue commands to multiple platforms (VMWARE, OPENSTACK, etc.)

-Similar to VPS in ability to allow user to subscribe to and provision resources instantly.
-Expands upon VPS service by allowing user to provision a resource pool (Virtual Data Center) with multiple VPS-like resources "inside."

Native Monitoring of EC Resources for Failover

DNS

-Rest API
-Domain templates
-GEO DNS
-Load balancing
-Quality of service

DNS Failover

Native Monitoring of ZERIGO VPS for Failover

Shared User Interface

Auto-Configuration of Domain to IP Mapping with Firewall Configuration

VPS (Virtual Private Servers)

-Custom proprietary automation of resource deployment
-Custom proprietary XEN SDK

FIG. 4

USER-CONFIGURABLE ALERTS FOR COMPUTING SERVERS

OVERVIEW

Computing servers are increasingly being used to provide various services over a network including, but not limited to, website hosting, remote data storage, remote computing services, virtual computing environments, and communication services such as voice-over-IP (VOIP), video conferencing, call exchange servers, and packet switching, and traffic management. For ease of reference, the various applications, systems and services that may be provided by computing servers may be collectively referred to as remote services.

SUMMARY

Various example implementations are directed to circuits, apparatuses, and methods for providing virtual computing services. According to an example embodiment, an apparatus includes a set of computing servers configured to provide a respective set of virtual servers for each of a plurality of accounts. The set of virtual servers for a first one of the accounts is configured to provide one or more VoIP services for users of the account. The apparatus also includes a processing circuit communicatively-coupled to the set of computing servers. The processing circuit is configured to determine an operating state of the respective set of virtual servers provided for each account. For each account, the processing circuit is also configured to provide an alert message to one or more users specified in a respective alert policy of the account in response to the operating state of the virtual servers satisfying a set of alert criteria indicated in the alert policy.

In another example embodiment, a method provides virtual servers for multiple accounts. The virtual servers for at least one account are configured to provide one or more VOIP services for users of the account. For each of a plurality of accounts, a respective set of virtual servers are provided. For each account, an operating state of the respective set of virtual servers is provided. In response to the operating state of a set of virtual servers satisfying a set of alert criteria indicated in an respective alert policy of the corresponding account, an alert message is provided to one or more users specified in the alert policy.

According to another example embodiment, an apparatus includes a computing circuit means for providing a respective set of virtual servers for each of a plurality of accounts. The virtual servers for at least one account are configured to provide one or more VOIP services for users of the account. The apparatus also includes a processing circuit means for determining an operating state of the respective set of virtual servers provided for each account, and for providing alert messages. More specifically, the processing circuit means provides an alert message to one or more users specified in a respective alert policy of the account in response to the operating state of the virtual servers satisfying a set of alert criteria indicated in the alert policy.

BRIEF DESCRIPTION OF THE DRAWINGS

The disclosure may be more completely understood in consideration of the following detailed description of various embodiments of the disclosure in connection with the accompanying drawings, in which:

FIG. 4 shows a block diagram of an example system configured to provide respective groups of virtual services for a number of accounts, with user configurable alert for each account.

Figure 1:
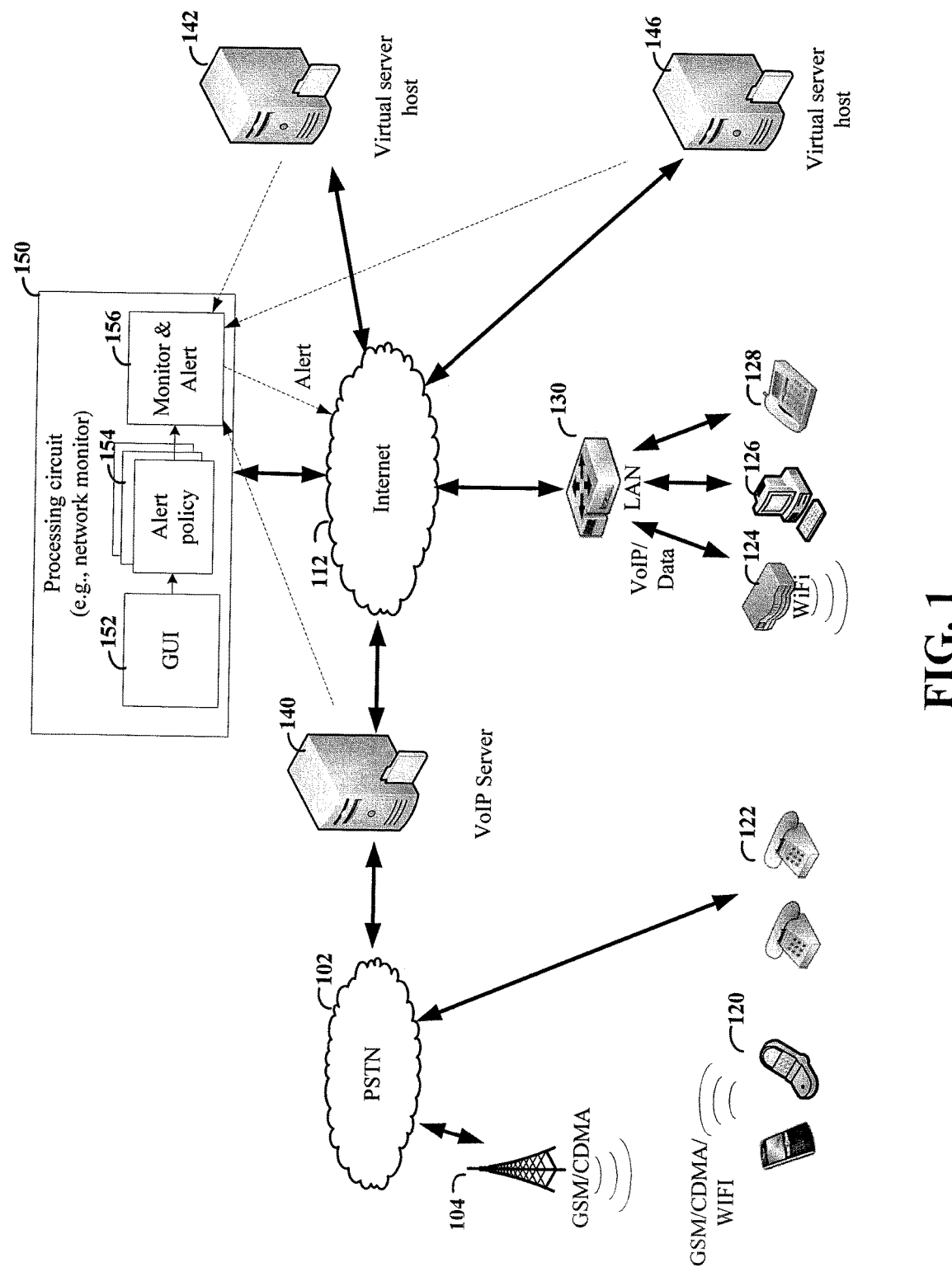
FIG. 1 shows an example network architecture with a processing circuit for monitoring and alerting a user of an operating status of a plurality of servers.

Various embodiments discussed herein are amenable to modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure are believed to be applicable to a variety of different types of apparatuses, systems, and methods involving computing servers. While not necessarily so limited, various aspects may be appreciated through a discussion of examples within this context. Various example implementations are directed to circuits, apparatuses, and methods for monitoring and/or analysis of computing servers. The disclosed embodiments are applicable to various types of computing servers, including physical and/or virtual servers, which may provide remote services including, for example, file servers, email servers, web hosting, domain name resolution and routing, virtual meeting services (e.g., VOIP), billing, and/or remote computing services (e.g., virtual desktops, virtual private servers, and/or virtual enterprise services). While the disclosed embodiments are not necessarily limited to such applications, various aspects of the present disclosure may be appreciated through a discussion of various examples in this context.

For example, in some embodiments, an apparatus is configured to provide a respective set of virtual servers for each of a plurality of user accounts. The apparatus includes a processing circuit configured to determine or retrieve an operating status of each virtual servers provided for a user account. The processing circuit is further configured to provide an alert message to an authorized user, in response to the operating status of one of the virtual servers satisfying alert criteria for the server that is indicated in an alert policy for the user account. A respective alert policy is maintained for each of the user accounts. The alert policy for an account may include respective sets of alert criteria for different virtual servers. The processing circuit is configured to monitor and provide alerts for multiple accounts according to a respective alert policy for each user account.

The alert criteria in the alert policy of an account may be specified as a function of various operating conditions of a virtual server. Some various conditions that may be used to trigger provision of an alert message include, but are not limited to, an operating state of the virtual server, processing load of the virtual server, memory usage of the virtual server, response time/latency of the virtual server, current number of users, and/or quality of service.

Alert messages may be provided using a number of different types of messages. For instance, in some implementations the processing circuit is configured to provide an SMS text message notification to one or more telephone numbers indicated in the alert policy. In some implementations, the processing circuit is configured to send an automated voice call to the telephone number(s). In some embodiments, the processing circuit is configured to send an email notification to an email address indicated in the alert policy. In some embodiments, alert messages are provided using other messaging services (e.g., Facebook, MySpace, Twitter, and/or Instant Messengers). In some implementations, multiple notifications are sent to multiple recipients and/or use multiple types of messages.

In some implementations, alert messages may be provided in real time as alert criteria are satisfied. Some other implementations may avoid generating an overly burdensome number of notifications by filtering notifications based on the frequency or number of the notifications. For example, one implementation limits generation of alert messages to a maximum frequency (e.g., one per hour) that is specified in the alert policy. Each alert message may summarize all instances of unauthorized access and/or system problems that have occurred since the last alert message was sent. As another example, some embodiments limit the number of alerts generated per day to a number indicated in the alert policy.

In some implementations, the processing circuit may be further configured to perform a set of actions listed in the alert policy, in response to the alert criteria for a virtual server being satisfied. In some implementations, an authorized user may be prompted to select an appropriate action to be taken. In some implementations, the alert message that is sent to an authorized user is configured to provide a mechanism for the user to select from one or more possible actions. For instance, in one implementation, an email or SMS text message may include a web address link to a webpage from which a user may select an action to take. In another implementation, a user may select a desired action by responding to an SMS text message with a text message indicating the selected action.

The settings of an alert policy (e.g., alert criteria for trigging alert messages, message options, users to alert, and/or additional actions to take in response to the criteria being satisfied) may be adjusted based on the requirements of the virtual servers that are monitored. In some embodiments, the processing circuit is configured to provide a graphical user interface (GUI) that may be used to adjust settings of the alert policy.

Turning now to the figures, FIG. 1 shows a telecommunication network including a plurality of computing servers (140, 142, and 146) providing various remote services to various end-point devices including, for example, mobile devices 120, plain-old telephones (POTS) 122, computers 126, and IP phones 128. The computing servers may include various physical or virtual servers, providing a variety of different remote services. In this example, the computing servers include a voice-over-IP (VOIP) server 140 and two virtual server hosts 142 and 146. Data transactions related to the services provided by the computing servers are communicated between the computing servers and the remote users over various data networks including, for example, the Internet 112, public service telephone networks 102, wireless networks 104 (e.g., GSM, CDMA, or LTE), and private data networks, including, but not limited to LAN 130, WiFi network 124, and/or Private Branch Exchange servers (not shown).

A processing circuit 150 monitors respective groups of virtual servers provided by computing serve servers 142 and 146 for each of a plurality of user accounts. In this example, the virtual servers are monitored by a processing circuit 150, which is communicatively-coupled thereto. The communicative-coupling of the computing servers (140, 142, and 146) and the processing circuit 150 may include either a direct connection or an indirect connection having, e.g., multiple connections, relay nodes, and/or networks in a communication path between the computing servers and the processing circuit 150. For each account, circuit 156 in the processing circuit 150 determines/retrieves an operating state of virtual servers of the account. In some implementations, the processing circuit may also monitor one or more physical servers (e.g., VoIP server 140) for a particular account. The circuit 156 sends an alert message to one or more users in response to the operating state(s) of the monitored servers satisfying alert criteria indicated in a respective alert policy 154 for the account. The alert message may be provided to the user(s) using various types of messages including, e.g., SMS text messages, email, voice recording, instant messaging, and/or social network messaging services. As indicated above, the alert criteria in the alert policy of an account may be specified as a function of various operating conditions of a monitored server. Some various conditions that may be used to trigger the provision of an alert message include, but are not limited to, an operating state of the server, processing load of the server, memory usage of the server, response time/latency of the server, current number of users, and/or quality of service.

In some implementations, the processing circuit 150 is also be configured to provide a GUI 152 that may be used by an authorized user of an account to modify the settings in the corresponding alert policy 154. For instance, the GUI 152 may be used to specify the alert criteria for each server of an account, specify users that are to receive alerts, specify the type of messages used for the alerts, and/or specify other actions to be taken in response to the alert criteria being satisfied.

Figure 2:
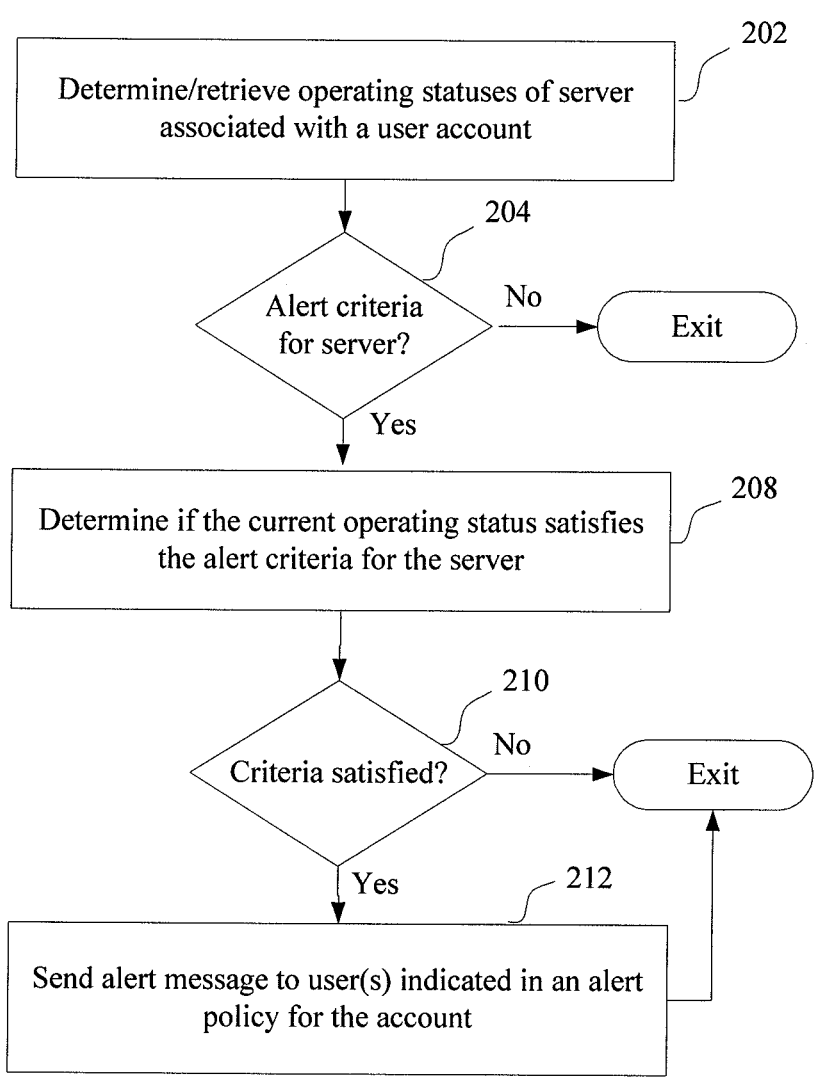
FIG. 2 shows an example process for monitoring the operating status of a computing server, in accordance with one or more embodiments of the present disclosure.

FIG. 2 shows an example process for monitoring the operating status of a virtual server, in accordance with one or more embodiments of the present disclosure. An operating status of a virtual server of a user account is determined or retrieved at block 202. If no alert criteria is specified for the virtual server in an alert policy of the account, decision block 204 directs the process to exit. Otherwise, at block 208, the process determines whether or not the current operating status of the virtual server satisfies the alert criteria for the virtual server. If the criteria is not satisfied decision block 210, the process exits. Otherwise, at block 212 an alert message is sent to one or more users indicated in the alert policy of the account.

In some implementations, the process automatically performs one or more actions specified in the alert policy, in response to the alert criteria being satisfied. For example, if the satisfied criteria indicate that a virtual server is down, the alert policy may prompt the process to automatically take some remedial actions including, for example, resetting the virtual server or switching to a backup server. In some embodiments, the process may prompt an authorized user to select from a set of possible actions, in response to the alert criteria being satisfied.

Figure 3:
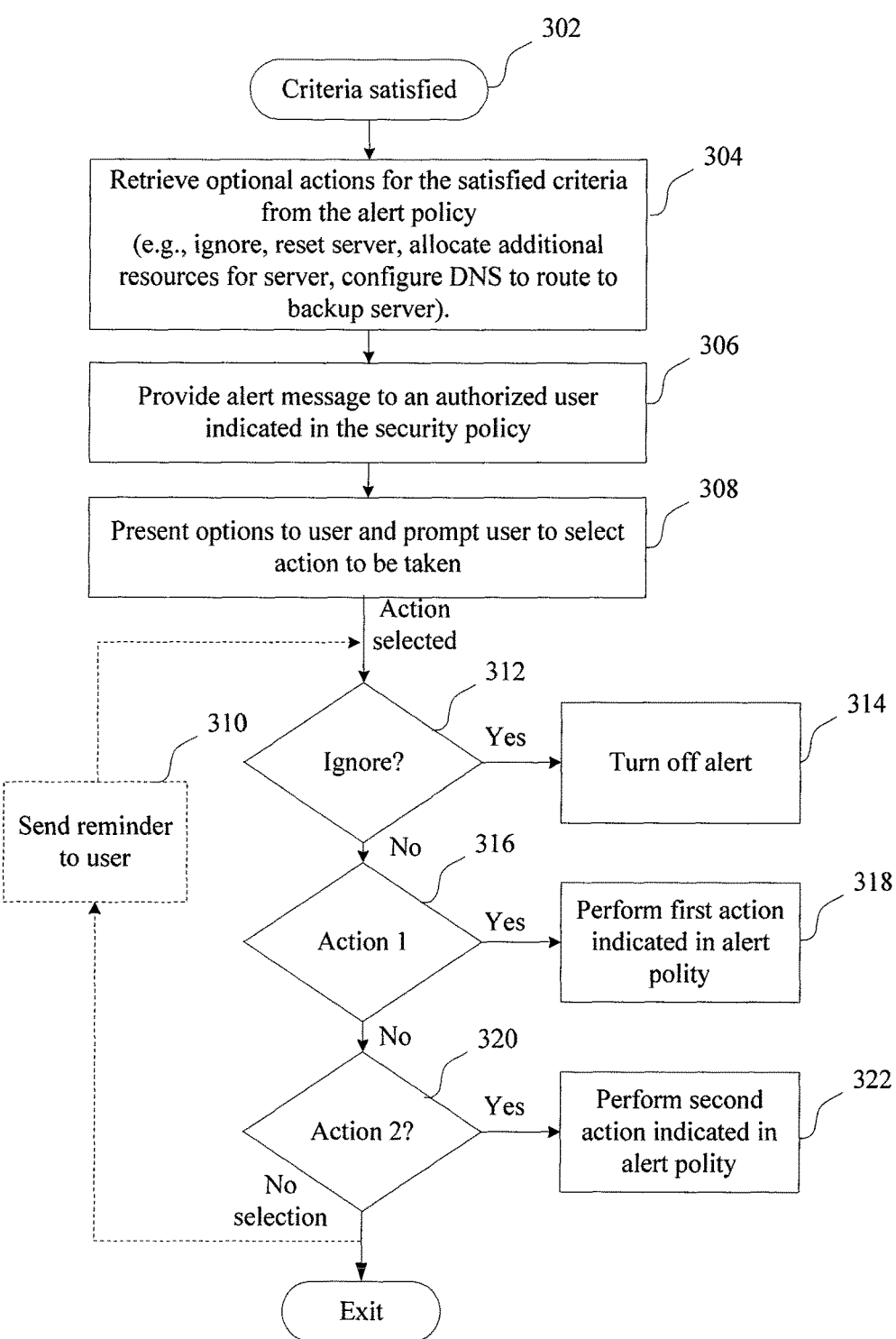
FIG. 3 shows an example process for providing an alert to an authorized user and prompting the user to select from a list of possible actions, in accordance with one or more embodiments of the present disclosure.

FIG. 3 shows an example process for providing an alert to an authorized user of an account and prompting the user to select a desired action, in accordance with one or more embodiments of the present disclosure. In response to alert criteria of a virtual server being satisfied at block 302, optional actions for the satisfied criteria are retrieved from the alert policy at block 304. At block 306, an alert message is provided to an authorized user indicated in the alert policy.

The options are presented to the user and the user is prompted to select an action to be taken at block 308. For example, in some embodiments, the alert message provided to a user at block 306 may indicate the options and provide a mechanism for the user to select an action to be taken. For instance, in one implementation, options are presented in a text message and the desired action is selected by replying to the text message with one of a plurality of designated responses. In another implementation, a link to a web-accessible GUI may be provided for the user to select from the set of actions.

The alert criteria may specify various possible actions that may be presented to the user. For instance, in one possible configuration of an alert policy, a user may ignore an alert, reset a virtual server, allocate additional server resources, and/or switch to a backup server. In the example shown in FIG. 3, a user is presented with three options (ignore, action 1, or action 2). If the ignore option is selected by a user, at decision block 312, the alert is turned off at block 314 and the process exits. If action 1 is selected by a user, at decision block 316, a first action indicated in the alert policy is performed at block 318. Similarly, if action 2 is selected by a user, at decision block 320, a second action indicated in the alert policy is performed at block 322. If no action is selected by a user, the process exits. In some implementations, if a user does not select an action within a specified amount of time, a reminder is sent to a user at block 310.

FIG. 4 shows a block diagram of an example system configured to provide respective groups of virtual services for a number of accounts, and provide customizable billing for each account. FIG. 4 shows various subsystems included in the example system (Z_system). The system includes multiple subsystems configured to provide respective virtual servers/services for various user accounts. For example, the system includes a first subsystem virtual desktop interface (VDI) 415, which is configured to provide virtual desktops for accounts subscribing to the service. Virtual desktops allow end-users to remotely connect to and run applications on a virtual desktop computer. The VDI subsystem provides a non-technical interface for authorized end-users of an account to provision virtual resources. In some implementations, the VDI subsystem 415 uses a subsystem VBRO-KER to issue commands to VMWARE View Horizon Environment. VBROKER is a full VMWARE view software development kit (SDK) that provides the ability to run custom Windows Powershell scripts against a VMWARE View Horizon Environment server in order to create, manage and synchronize information about desktop pool resources of the system. VBROKER may also be applicable to other subsystems shown in FIG. 4, as well as various other applications utilizing VMWARE.

The system also includes a second subsystem Virtual Private Servers (VPS) 420, which can be configured to virtualize various servers for an account. In some implementations, the VPS subsystem 420 automates deployment of resources allocated for an account. For instance, the VPS subsystem 420 may provide various virtual servers/services including, but not limited to, file servers, email servers, web hosting, and virtual meeting services (e.g., VOIP), etc. In some scenarios, the VPS subsystem 420 may be accessible by virtual desktops (via VDI), by external computers (via the internet), or both. In some implementations, the virtual servers/services provided by the VPS subsystem 420 may be configured using a SDK such as XEN. The SDK may be used, for example, to customize and/or maintain virtual services provided by the VPS system for an account.

The system shown in FIG. 4 also includes a third subsystem (Enterprise Cloud) 430 that is configured to provide a virtual data centers for an account. The Enterprise Cloud subsystem 430 allows users to dynamically subscribe to provision resources (e.g., virtual servers/services). Users may create a virtual data center having a pool of resources, which may include a number of VPS-like servers/services. For each account, a respective virtual data center provided by the Enterprise Cloud 430 may be configured to include a number of VPS and/or virtual desktops connected in any number of different configurations. For instance, a virtual data center may include a plurality of redundant virtual file servers and a virtual load balancer that routes traffic to balance traffic load of the virtual file servers. The virtual data center provided by the Enterprise Cloud 430 may include a firewall between a network and the virtual data center. Additionally or alternatively the virtual data center may include firewalls to protect individual virtual servers/desktops in the virtual data center.

In some implementations, a virtual data center provided by the Enterprise Cloud 430 for an account includes a group of virtual desktops and/or virtual servers indicated in respective settings files for the account. The virtual desktops and/or virtual servers in the virtual data center may be provided by the VDI and VPS subsystems 415 and 420 via a shared user interface. The settings file for each account may include server settings for each virtual desktop and/or virtual servers included in the respective virtual data center. The server settings may include a pointer to a VMWARE image and also specify computing resources to dedicate to execution of the corresponding virtual desktops and/or virtual servers. The virtual servers may provide various types of services including, for example, file servers, email servers, web hosting, virtual meeting services (e.g., VOIP), billing, and/or remote computing services, routing, load balancing, and/or switch board services (e.g., Private Branch Exchange).

The virtual desktops and/or virtual servers are interconnected in the virtual data center according to data center configuration settings included in the respective settings files for the account. During operation, computing servers of the Enterprise Cloud 430 emulate the virtual data center by emulating the virtual desktops and/or virtual servers indicated in the server settings, and also emulating the virtual connections specified in the data center configuration settings. In some implementations, emulation of the virtual data centers in the Enterprise Cloud 430 includes execution of a resource management process, configured to assign computing resources allocated for the virtual data center for emulation of the virtual desktops, virtual servers, and connections of the virtual data center.

In some implementations, a virtual data center provides a perimeter firewall between an internal network of the virtual data center and an external network. The perimeter firewall may provide network protection for the virtual data center with stateful packet inspection, access-control lists, network address translation (NAT), and virtual private network (VPN) connections. In some implementations, the virtual data center may also include individual firewalls isolating one or more virtual servers/desktops from other virtual servers/desktops in the virtual data center. In some implementations a web-based GUI is provided for configuration of access rules enforced by the firewall(s) which may include, for example, whitelists or blacklists of services to pass/block and/or users or IP addresses to allow access. The GUI may also be used to configure internet access rules for public facing applications, or to create one or more VPN tunnels connecting one or more end-user networks to the virtual data center.

In some implementations, the virtual data centers run on a VMWARE platform leveraging a fault tolerant storage area network (SAN). In some implementations, the Enterprise Cloud subsystem 430 uses VBROKER to issue commands to VMWARE hosting the virtual servers/desktops. VBROKER provides an application program interface (API) to communicate with VMWARE. For example, VBROKER may translate VPS API calls into commands/scripts against VBLOCK. VBROKER may be used as middleware to issue commands to various platforms (e.g., VMWARE or OPEN-STACK).

VMWARE vSphere availability features may be employed to keep the virtual network, and/or the virtual servers and virtual desktops therein, running in the event of a server failure. Features such as vMotion and storage vMotion may also be used to protect against interruption of service due to hardware failure. In some implementations, the servers providing the virtual data center may include fault-tolerant hard-disk storage. For example, each disk may have two serial attached small-computer system-interface (SAS) connectors attaching it to diverse storage processors inside the storage area network. The dual SAS connections allow the storage area network to see the disks on separate data paths and, in the event of a failure, reroute the storage operations through an available path with no noticeable performance impact. In addition, the potential for data loss or corruption due to a bus reset is completely eliminated. The disks themselves reside in storage shelves with redundant power supplies, and cabling attaching the disks to the multiple storage processors. As redundancy is built into the system, redundant virtual servers are not needed to achieve system fault tolerance in the virtual data center.

In some implementations, each account may be allocated a dedicated amount of computing resources of a plurality of computing servers (e.g., in a cloud). For instance, each account may be provided with a certain number of CPU cores, memory, storage, and/or bandwidth, which are dedicated to the account. The pre-allocation of dedicated resources improves reliability in high-traffic conditions.

In some implementations, the plurality of computing servers is also configured to provide a GUI for adjusting configuration settings of the virtual data center. For example, the GUI may provide an interface for an authorized user of the account to configure virtual desktops, virtual servers, connections, and/or settings of the virtual data center. For instance, the GUI may provide an interface to assign a subset of available computing resources (e.g., processing cores/time, memory or storage) for the account to particular virtual desktops and/or virtual servers in the virtual data center. The GUI may also provide a mechanism to import and/or replicate virtual machines in the virtual data center. In some implementations, the GUI may provide the ability to save a backup or snapshot of the layout and configuration of the virtual data center.

The system shown in FIG. 4 also includes a domain name server (DNS) subsystem 440. The DNS subsystem 440 is configured to dynamically map each domain name associated with an account to an IP address of a select virtual server or service provided for the account. For each account, the mapping of domain names is performed according to a respective set of mapping criteria indicated in a settings file of the account.

As indicated above, various mapping criteria may be utilized by the various accounts to map the domain names to the virtual servers/services. For example, the mapping criteria may map domain names as a function of the operating status of the virtual servers/services, processing load of the virtual servers (e.g., load balancing), network traffic conditions (e.g., latency and bandwidth), quality of service requirements, geographical location of an end-user submitting a DNS query, permissions of the end user, date or time of the DNS query, type of virtual server associated with the domain name, and/or number of servers associated with the domain name. In some implementations, the system provides a web-based GUI configured and arranged to allow one or more authorized users for the account to adjust the mapping criteria indicated in the settings file.

In some implementations, the DNS subsystem 440 performs the mapping of the domain name associated with an account according to a respective set of mapping criteria indicated in a settings file of the account. For each account, the DNS subsystem 440 may map domain names to IP addresses of the virtual servers according to various mapping criteria. For example, in some implementations, the mapping criteria may cause the DNS subsystem 440 to map domain names based on the operating status of the virtual servers. For instance, the mapping criteria may map a domain name to a first virtual server while the first virtual server is operating correctly. In response to the first server going down, the mapping criteria may map the domain name to a backup virtual server. As another example, the mapping criteria may cause the DNS subsystem 440 to map domain names based on processing load of the virtual servers. For instance, domain names may be mapped to balance processing load between a plurality of virtual servers. In some implementations, the mapping criteria may cause the DNS subsystem 440 to map domain names based on the geographical location of the user submitting a domain name query to the DNS subsystem 440.

Various implementations may additionally or alternatively use other criteria for mapping of domain names including, but not limited to, date or time of the DNS query, type of virtual server associated with the domain name, number of servers associated with the domain name, and/or permissions of user submitting the DNS query.

In various implementations, a respective set of mapping criteria may be used for each account. This allows the domain names mapping criteria to be customized for the particular needs and services of each account. In some implementations, the DNS subsystem 440 provides an representational state transfer (REST) API for configuration of DNS mapping for an account. In some implementations domain templates, having various preconfigured mapping criteria, may be provided for easy configuration of the DNS subsystem 440 for an account. In some implementations, the DNS subsystem 440 auto-configures mapping based on virtual services provided for the account by the other subsystems (e.g., 415, 420 and/or 430).

In some implementations, the DNS subsystem 440 provides a web-based GUI configured and arranged to allow one or more authorized users of the account to adjust the mapping criteria indicated in the settings file. An authorized user may specify a single set of mapping criteria for all virtual servers associated with the account or may specify a different set of mapping criteria for different types of virtual servers or for different virtual servers of the same type. Further, an authorized user may specify different sets of mapping criteria for different departments or users associated with the account.

In this example, the system also includes a fourth subsystem (Watchdog) 450 configured to monitor status of the virtual servers/services provided for the various accounts. The Watchdog subsystem 450 is configured to determine the operating status of the virtual servers/services provided for each account. For instance, Watchdog subsystem 450 may be configured to monitor services provided by the other subsystems (e.g., 415, 420 and/or 430) for fall over. Watchdog subsystem 450 may provide domain monitoring across multiple services. The Watchdog subsystem 450 may provide real-time event tracking for the services for each account.

In some implementations, the Watchdog subsystem 450 provides a GUI for display and analysis of the operating status of virtual servers/services provided for an account. In some implementations, the GUI is configured to display a respective timeline for each of a plurality of servers. Each timeline may have graphical time blocks for each of the plurality of time periods. Each time block has a graphical indication that describes the operating state of the server during the corresponding time period. The timelines may be rearranged by a user for visual comparison and analysis of the operating state of the virtual servers/services. Such visual analysis may be useful, for instance, for distinguishing between network events affecting multiple servers, and server events affecting an individual server.

Consistent with the above described examples, in some implementations, the Watchdog subsystem 450 may be configured to provide an alert to one or more authorized users of the account if the operating status of the virtual servers/services satisfies alert criteria indicated in an alert policy for the account. The Watchdog subsystem 450 may provide alerts using various messaging mechanisms including, for example, SMS text messages, automated phone calls, emails, and/or other messaging services (e.g., Facebook, Myspace, Twitter, and/or Instant Messengers). In some implementations, multiple notifications are sent to multiple recipients and/or use multiple types of messages. In some implementations, the GUI for adjusting mapping criteria may also be used to adjust the trigger conditions and/or alert message options.

In some implementations, the DNS subsystem 440 is configured to map domain names to the virtual servers/services based on the operating statuses of the virtual servers/services, as determined by the Watchdog subsystem 450. For example, the DNS subsystem may be configured to remap a domain name from a first virtual server to a backup virtual server in response to the first virtual server becoming unresponsive.

The system shown in FIG. 4 also includes a subsystem (Z Common) 460 configured to provide billing for various services provided for an account. The subsystem handles rate plans, usage statistics, and billings for various services of the system. The Z Common subsystem 460 may bill services using flat rates for specified time-periods (e.g., a monthly rate), or using usage rates indicating a specified billing rate for a specified amount of use (e.g., time, amount of data, and/or number of users). The Z Common subsystem 460 is configurable as a plug-and-play component to provide billing services for various independent systems. In some implementations, a GUI is provided for authorized users to manage services, billing options, payment options, account specific alerts, and/or various administrated options. In some implementations, the GUI provides an interface for a user to configure subscription and billing.

The system includes a subsystem (Z Control) 410, which configures settings of one or more of the subsystems for respective accounts of the system. In some implementations, the Z Control subsystem 410 stores data indicating services, provided by the various subsystems (e.g., 415, 420, 430, 440, and/or 450), which are subscribed to for each account. The Z Control subsystem 410 may further store user-configurable settings for the subscribed to services for each respective account. For example, the settings for an account may indicate settings for one or more virtual servers provided for the account by the VPS subsystem 420. In some implementations, the Z Control subsystem 410 may provide a GUI for authorized users of an account to manage virtual services subscriptions, and/or various administrated options.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., a computing server, a network monitor, and/or a GUI). For example, in certain of the above-discussed embodiments, one or more modules are discrete logic circuits or programmable logic circuits configured and arranged for implementing these operations/activities, as in the blocks shown in FIG. 1. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

The various embodiments described above are provided by way of illustration only and should not be construed to limit the disclosure. Based upon the above discussion and illustrations, those skilled in the art will readily recognize that various modifications and changes may be made without strictly following the exemplary embodiments and applications illustrated and described herein. For instance, although implementations may in some cases be described in individual figures, it will be appreciated that features from one figure can be combined with features from another figure even though the combination is not explicitly shown or explicitly described as a combination. The disclosure may also be implemented using a variety of approaches such as those involving a number of different circuits, operating systems, and/or software programs/packages. Such modifications and changes do not depart from the true spirit and scope of the present disclosure, including that set forth in the following claims.

What is claimed is:

1. A method comprising:

configuring, via a user interface operable on behalf of one of a plurality of accounts, a virtual data center for said one of the plurality of accounts which enables a plurality of virtual servers to be used in the virtual data center, the virtual servers forming a virtual server set;

via the virtual server set, processing different types of data communications as part of data communications services linked to said one of the plurality of accounts, wherein the different types of the data communications processed as part of the data communications services include voice-over-IP services and at least one additional service from among the following services for web hosting, virtual meetings, billing, remote computing, call routing, load balancing, and switch board services through use of a private branch exchange, wherein the act of processing the different types of data communications as part of the data communications services is performed to provide one or more of the data communications services via a data-communications system; and via a processing circuit communicatively coupled to the virtual server set and on behalf of said one of the plurality of accounts:

determining at least one operating state concerning the virtual server set;

accessing an alert policy;

assessing whether the at least one operating state of the virtual server set, relative to alert criteria indicated in the alert policy, deems that an alert message to one or more users specified in the alert policy should be sent; and providing optional actions in association with the alert message, the optional actions enabling configuration of two or more of: the data communications services, the virtual data center, or the alert policy.

2. The method of claim 1, further comprising permitting an authorized user among the one or more users specified in the alert policy or another authorized individual, to operate the user interface to effect changes in a settings file associated with said one of the plurality of accounts.

3. The method of claim 1, further comprising obtaining a settings file that is associated with said one of the plurality of accounts, wherein the settings file characterizes how resources are to be provisioned for use with the virtual data center.

4. The method of claim 3, wherein the alert policy is associated with the settings file.

5. The method of claim 1, wherein the at least one operating state is determined for multiple ones of the virtual servers of the virtual server set.

6. The method of claim 1, wherein the virtual data center includes a plurality of computing servers that are configurable to provide the virtual server set for said one of the plurality of accounts.

7. The method of claim 1, further including providing, via the data-communications system, the data communications services, wherein the data communication services include the voice-over-IP services over a broadband network for a plurality of different entities respectively associated with the plurality of accounts.

8. The method of claim 1, wherein the alert message specified via the alert policy is to be conveyed by at least one of the following: sending an SMS text message, sending an email, and placing a phone call.

9. The method of claim 1, further including performing a set of actions listed in the alert policy in accordance with the alert criteria being satisfied.

10. The method of claim 1, further including prompting a user, identified in the alert policy and in accordance with the alert criteria being satisfied, to select an appropriate action from the optional actions to be taken.

11. The method of claim 1, further including prompting, in accordance with the alert criteria being satisfied, one of the one or more users indicated in the alert policy to select an appropriate action from the optional actions to be taken, and presenting the one of the one or more users with a list of actions or responses specified in the alert policy, the list of actions or responses including at least three different actions or responses, and including do nothing.

12. The method of claim 1, wherein the alert criteria are specified as a function of an operating state, and of a processing load, of at least one of the virtual servers.

13. The method of claim 1, wherein the alert criteria are specified as a function of memory usage linked to the virtual server set.

14. The method of claim 1, wherein the alert criteria are specified as a function of response time or latency of the virtual server set.

15. The method of claim 1, wherein the alert criteria are specified as a function of at least one of: a number of current users identifiable via the virtual server set, and a quality of service provided by the virtual server set.

16. An apparatus comprising:

a data-communication system including a plurality of data-communication servers configurable as a set of virtual servers ("virtual server set");

a user interface, as part of a data-processor computer circuit, configured to be operated on behalf of one of a plurality of accounts served by the data-communication system and to cause configuration of the virtual server set to be used in a virtual data center for said one of the plurality of accounts;

wherein the data-communication system, via the virtual server set, is configured to process different types of data communications as part of data communications services linked to said one of the plurality of accounts, and the different types of the data communications processed as part of the data communications services include voice-over-IP services and at least one additional service from among the following services for web hosting, virtual meetings, billing, remote computing, call routing, load balancing, and switch board services through use of a private branch exchange; and a data-processing circuit, communicatively-coupled to the virtual server set and to be operated on behalf of said one of the plurality of accounts, to:

determine at least one operating state concerning the virtual server set;

access an alert policy;

assess whether the at least one operating state of the virtual server set, relative to alert criteria indicated in the alert policy, deems that an alert message to one or more users specified in the alert policy should be sent, wherein the alert criteria is specified as a function of at least one of: response time, latency of the virtual server set, a number of current users identifiable via the virtual server set, and a quality of service provided by the virtual server set; and provide optional actions in association with the alert message, the optional actions enabling configuration of two or more of: the data communications services, the virtual data center, or the alert policy.

17. The apparatus of claim 16, wherein the data-processing circuit is configured to receive inputs, from the user interface, and to configure the virtual server set based on a characterization of certain resources.

18. An apparatus for use in a data-communication system including a plurality of data-communication servers configurable as a set of virtual servers ("virtual server set"), the apparatus comprising:

a data-processor computer circuit configured to:

provide a user interface that is to be operated on behalf of one of a plurality of accounts served by the data-communication system and to cause configuration of the virtual server set to be used in a virtual data center for said one of the plurality of accounts;

cause the virtual server set to process different types of data communications as part of data communications services linked to said one of the plurality of accounts, and the different types of the data communications processed as part of the data communications services include voice-over-IP services and at least one additional service from among the following services for web hosting, virtual meetings, billing, remote computing, call routing, load balancing, and switch board services through use of a private branch exchange, wherein the virtual server set is configured to process the different types of data communications as part of the data communications services via communications provided through the data-communication system;

determine at least one operating state concerning the virtual server set;

access an alert policy;

assess whether the at least one operating state of the virtual server set, relative to alert criteria indicated in the alert policy, deems that an alert message to one or more users specified in the alert policy should be sent; and providing optional actions in in association with the alert message, the optional actions enabling configuration of two or more of: the data communications services, the virtual data center, or the alert policy.

19. A method comprising:

configuring, via a user interface operable on behalf of one of a plurality of accounts, a virtual data center for said one of the plurality of accounts which enables a plurality of virtual servers ("virtual server set") to be used in the virtual data center, wherein the virtual data center includes a plurality of computing servers that are configurable to provide the virtual server set for said one of the plurality of accounts;

processing, via the virtual server set, different types of data communications as part of data communications services linked to said one of the plurality of accounts, wherein the different types of the data communications processed as part of the data communications services include voice-over-IP services and at least one additional service from among the following services for web hosting, virtual meetings, billing, remote computing, call routing, load balancing, and switch board services through use of a private branch exchange; and via a processing circuit communicatively coupled to the virtual server set and on behalf of said one of the plurality of accounts:

determining at least one operating state concerning the virtual server set;

accessing an alert policy;

assessing whether the at least one operating state of the virtual server set, relative to alert criteria indicated in the alert policy, deems that an alert message to one or more users specified in the alert policy should be sent; and providing optional actions in association with the alert message, the optional actions enabling configuration of two or more of: the data communications services, the virtual data center, or the alert policy.

20. A method comprising:

configuring, via a user interface operable on behalf of one of a plurality of accounts, a virtual data center for said one of the plurality of accounts which enables a plurality of virtual servers ("virtual server set") to be used in the virtual data center, processing, via the virtual server set, different types of data communications as part of data communications services linked to said one of the plurality of accounts, wherein the different types of the data communications processed as part of the data communications services include voice-over-IP services and at least one additional service from among the following services for web hosting, virtual meetings, billing, remote computing, call routing, load balancing, and switch board services through use of a private branch exchange;

using, via a user Internet-communication-enabled device, the data communications services through permission granted through said one of the plurality of accounts; and via a processing circuit communicatively coupled to the virtual server set and on behalf of said one of the plurality of accounts:

determining at least one operating state concerning the virtual server set;

accessing an alert policy;

assessing whether the at least one operating state of the virtual server set, relative to alert criteria indicated in the alert policy, deems that an alert message to one or more users specified in the alert policy should be sent; and providing optional actions in association with the alert message, the optional actions enabling configuration of two or more of: the data communications services, the virtual data center, or the alert policy.

21. The method of claim 20, wherein the configuring the virtual data center includes characterizing how resources are to be provisioned for use with the virtual data center.

* * * * *